Nov. 6, 1923.
C. B. O'NAN
1,473,508
MIXING DEVICE
Filed Sept. 20, 1921
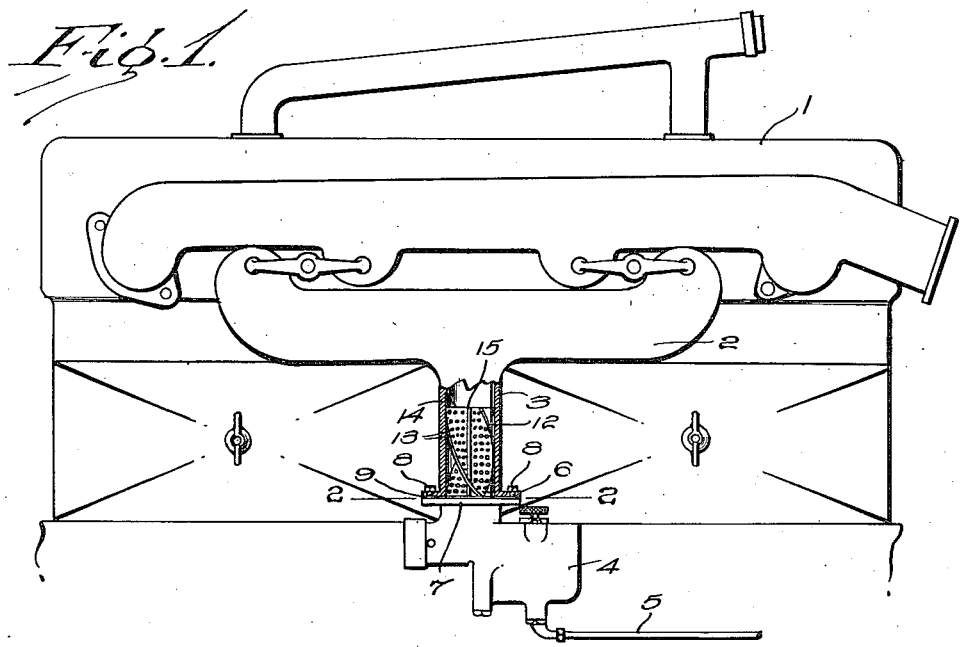
Fig. 1.
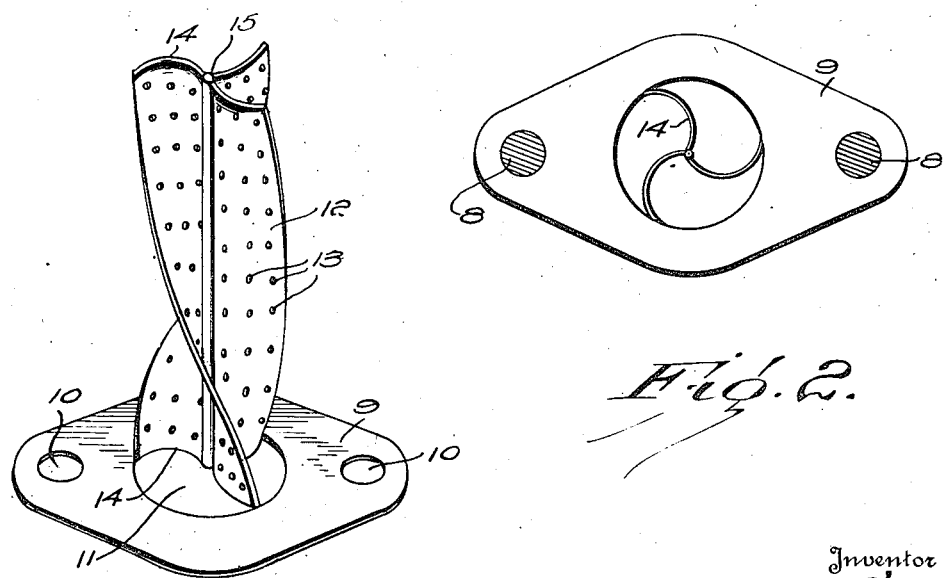
Fig. 2.
Fig. 3.
Inventor
CHARLES B. O'NAN
By
Attorney Patented Nov. 6, 1923.

1,473,508

UNITED STATES PATENT OFFICE.

CHARLES B. O'NAN, OF EL PASO, TEXAS, ASSIGNOR OF ONE-HALF TO J. C. SMITH, OF EL PASO, TEXAS.

MIXING DEVICE.

Application filed September 20, 1921. Serial No. 501,947.

*To all whom it may concern:*

Be it known that I, CHARLES B. O'NAN, a citizen of the United States, residing at El Paso, in the county of El Paso and State of Texas, have invented certain new and useful Improvements in Mixing Devices, of which the following is a specification.

This invention relates to mixing devices for internal combustion engines, and it comprises a plurality of perforated blades arranged in the feed pipe between the carburetor and the intake manifold and extending spirally of the feed pipe.

An object of the invention is the provision of a simple mixing device which may be applied to any internal combustion engine and which will insure complete mixture of the fuel charge and air.

A further object is the provision of a mixer formed of a plurality of perforated plates or blades through which the atomized fuel is adapted to pass and by means of which the charge is given a whirling motion to insure complete carburation.

A further object is the provision of a mixer having blades curved in transverse cross section to assist in whirling the fuel charge.

In the accompanying drawings, I have shown one embodiment of the invention. In this showing:

Figure 1 is a side elevation of an internal combustion engine showing the invention applied, Figure 2 is a horizontal sectional view on line 2—2 of Figure 1, and, Figure 3 is a detail view of the mixer detached.

Referring to the drawings, the reference numeral 1 designates generally an internal combustion engine having an intake manifold 2, provided with the usual vertical feed pipe 3. Fuel is delivered to the engine through carburetor 4 which is connected with a source of fuel supply by means of pipe 5. The construction heretofore described is the usual engine construction and forms no part of the invention except in the combination claimed.

The lower end of the feed pipe 3 is provided with a flange 6 and the carburetor is provided with a flange 7 which flanges are adapted to receive bolts 8 whereby the carburetor is connected to the manifold. The mixer comprises a plate 9 formed of substantially the same shape as the flanges 6 and 7. This plate is adapted to be arranged between the flanges and is provided with openings 10 for the reception of bolts 8. The plate is provided with a central opening 11 to permit communication between the carburetor and pipe 3. A plurality of blades 12 are secured to the plate 9, the blades being provided with spaced perforations 13. As shown, the blades are adapted to extend into the pipe 3 and are arranged spirally. The blades are further curved in transverse cross section, as indicated at 14. A central reenforcing rod 15 may be arranged at the junction of the blades which, as shown, extends substantially radially of the pipe 3.

In operation, the charge of fuel and air passing into the pipe 3 from the carburetor is whirled in such a manner that the gasoline or other fuel is forced through the small perforations of the blades and broken up into very small particles which will instantly mix with the air and become a pure dry gas before the mixture reaches the cylinders of the engine, whereby complete combustion is obtained and a material increase of power results. The provision of a mixing device which will thoroughly and completely mix the fuel and air and provide complete combustion in the engine cylinders reduces the deposition of carbon on the walls of the engine cylinders and thus eliminates a number of engine troubles resulting from this source, such as over heating of the engine, corrosion of spark plugs and similar troubles.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A mixer for internal combustion engines comprising a blade having a central opening, a plurality of radially disposed perforated blades extending upwardly from said blade, a reenforcing member arranged centrally of said opening and secured to the inner edges of said blades, said blades being curved in transverse cross section and having their outer edges arranged spirally.

2. A mixer for internal combustion engines comprising a plurality of radially disposed perforated blades adapted to be arranged in the intake pipe between the carburetor and manifold, the inner edges of said blades being connected to each other at substantially the axis of said pipe, said blades being curved in transverse cross-section, and the outer edges of said blades being arranged spirally of the axis of the pipe.

In testimony whereof I affix my signature in presence of two witnesses.

CHARLES B. O'NAN.

Witnesses:
   JNO. S. THOMPSON,
   WALTER H. SCOTT.